Figure 6:
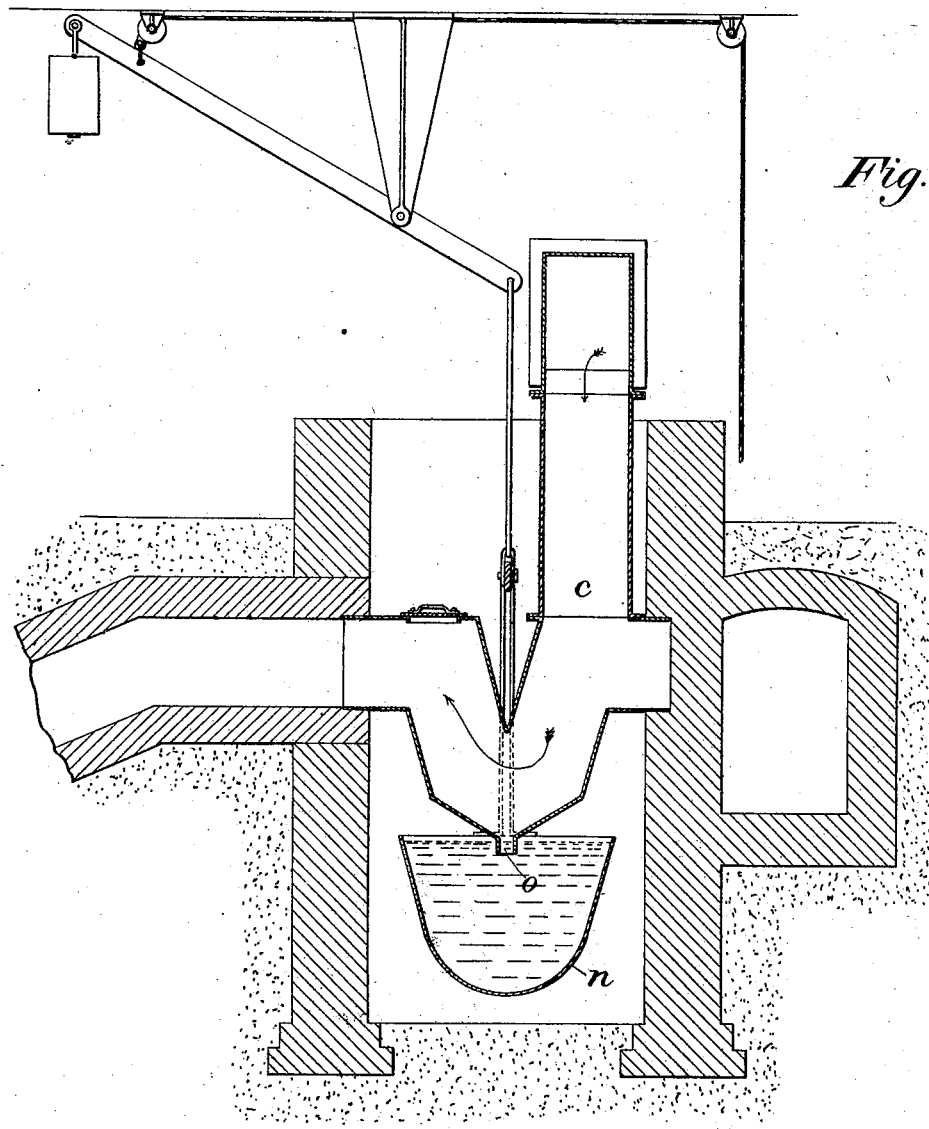

(No Model.) 4 Sheets—Sheet 1.
J. W. WAILES.
HOT BLAST VALVE.
No. 501,750. Patented July 18, 1893.
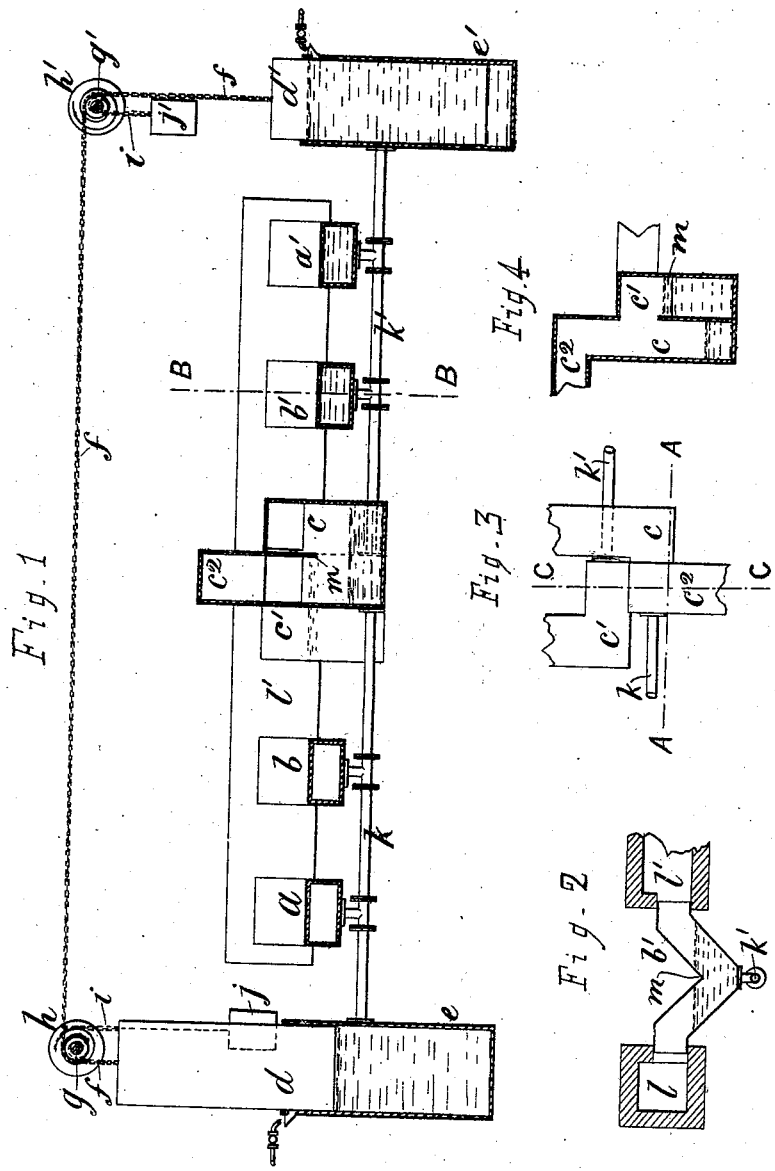
Witnesses
James Dobson
Charles Wilson
Inventor
John William Wailes (No Model.) 4 Sheets—Sheet 2.
J. W. WAILES.
HOT BLAST VALVE.
No. 501,750. Patented July 18, 1893.
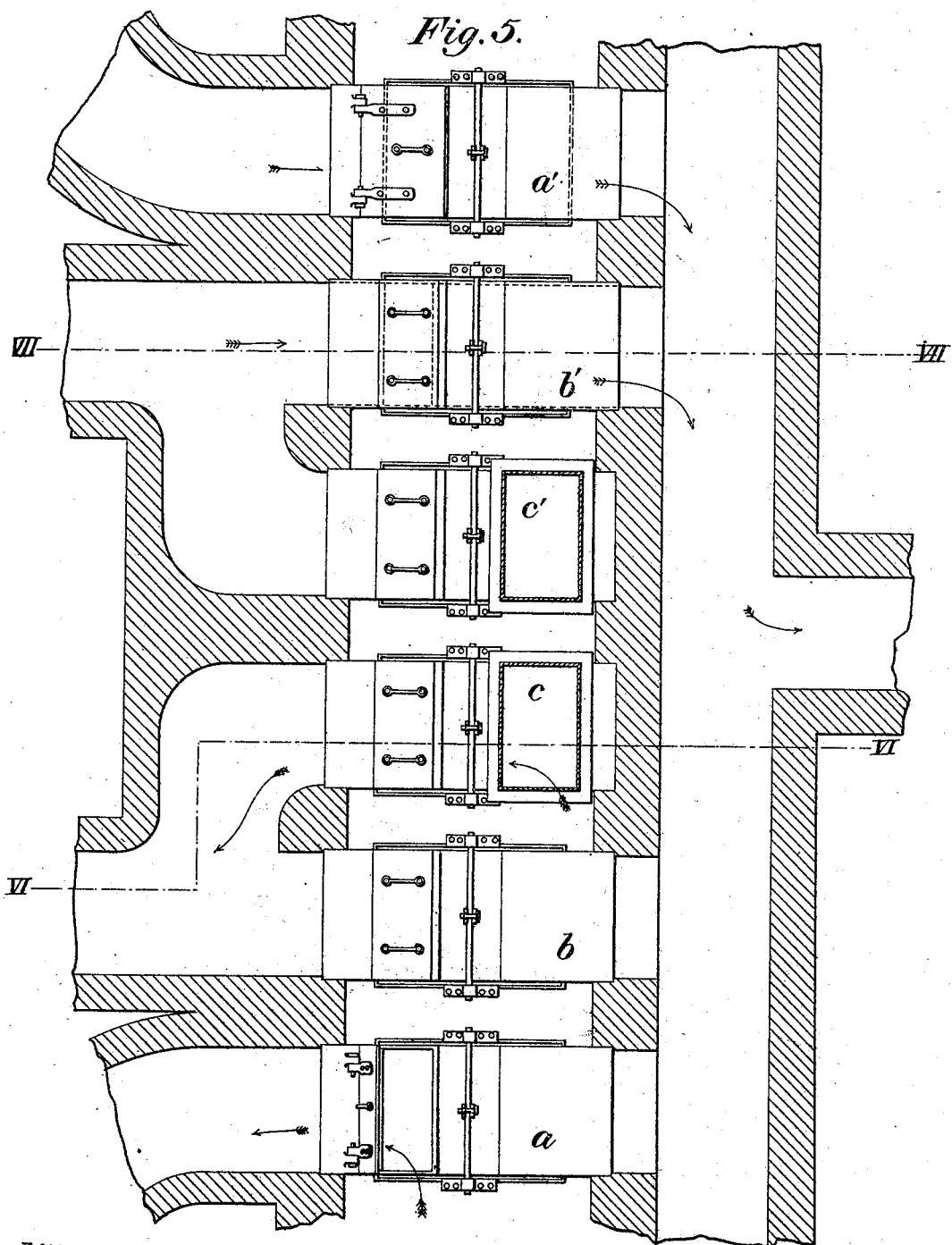
Witnesses
H. M. Corwin
W. B. Corwin
Inventor
John William Wailes
by H. Bakewell Sons
his attorneys (No Model.)  J. W. WAILES.  4 Sheets—Sheet 3.
HOT BLAST VALVE.

No. 501,750.  Patented July 18, 1893.

Witnesses  Inventor (No Model.) 4 Sheets—Sheet 4.

J. W. WAILES.
HOT BLAST VALVE.

No. 501,750. Patented July 18, 1893.

Witnesses

Inventor
John William Wailes
by W. Bakewell Sons
his attorneys

UNITED STATES PATENT OFFICE.

JOHN WILLIAM WAILES, OF GATESHEAD-ON-THE-TYNE, ENGLAND.

HOT-BLAST VALVE.

SPECIFICATION forming part of Letters Patent No. 501,750, dated July 18, 1893.

Application filed October 20, 1892. Serial No. 449,507. (No model.) Patented in England March 26, 1889, No. 5,156.

*To all whom it may concern:*

Be it known that I, JOHN WILLIAM WAILES, a subject of the Queen of Great Britain, and a resident of Gateshead-on-the-Tyne, in the county of Durham, England, have invented a new and useful Improvement in Valves, (for which I have obtained Letters Patent in Great Britain, No. 5,156, dated March 26, 1889;) and I do hereby declare the following to be a full, clear, and exact description thereof.

The importance of thoroughly efficient valves for furnaces using gaseous fuel is sufficiently well known to users of such furnaces for taking into consideration the large amount of coal that is applied to manufacturing purposes in the form of gas it is evident that a very small per centage of gas escaping to the chimney without passing through the furnaces or doing work, represents in the yearly aggregate a very formidable sum to be put down under the head of absolute loss. Regarding the functions of these valves, the first consideration that strikes me is that the currents to be controlled and directed are of very small pressure not equal to more than about from one half to three quarters of an inch of water. If it were only a question of dealing with the incoming gas and air at their moderate temperatures, the problem of providing efficient valves would not be of very great difficulty, but owing to the temperature of the outflowing currents being often sufficiently high to destroy the fit of the valves, the difficulty of the solution of the problem is increased. Again, another obstacle to obtaining efficient valves exists in the fact that the pressure of gas acts on one side of the valves, and the chimney draft on the other so that any inaccuracy in the fit of the valves allows of very serious loss of gas. Additional trouble arises when such escape takes place, owing to the escaping gas igniting at the under side of the valves, and the heat produced damaging the valves and their connections.

Now the main objects of my invention are to provide valves which shall be absolutely gas-tight under all conditions, and which although using water as a seal, shall entirely avoid any objections to the use of water arising from evaporation filling the flues with vapor, or from cooling the current so as to impair the draft, besides being simple in construction, durable in use, not liable to derangement, and easily opened and closed.

Figure 7:
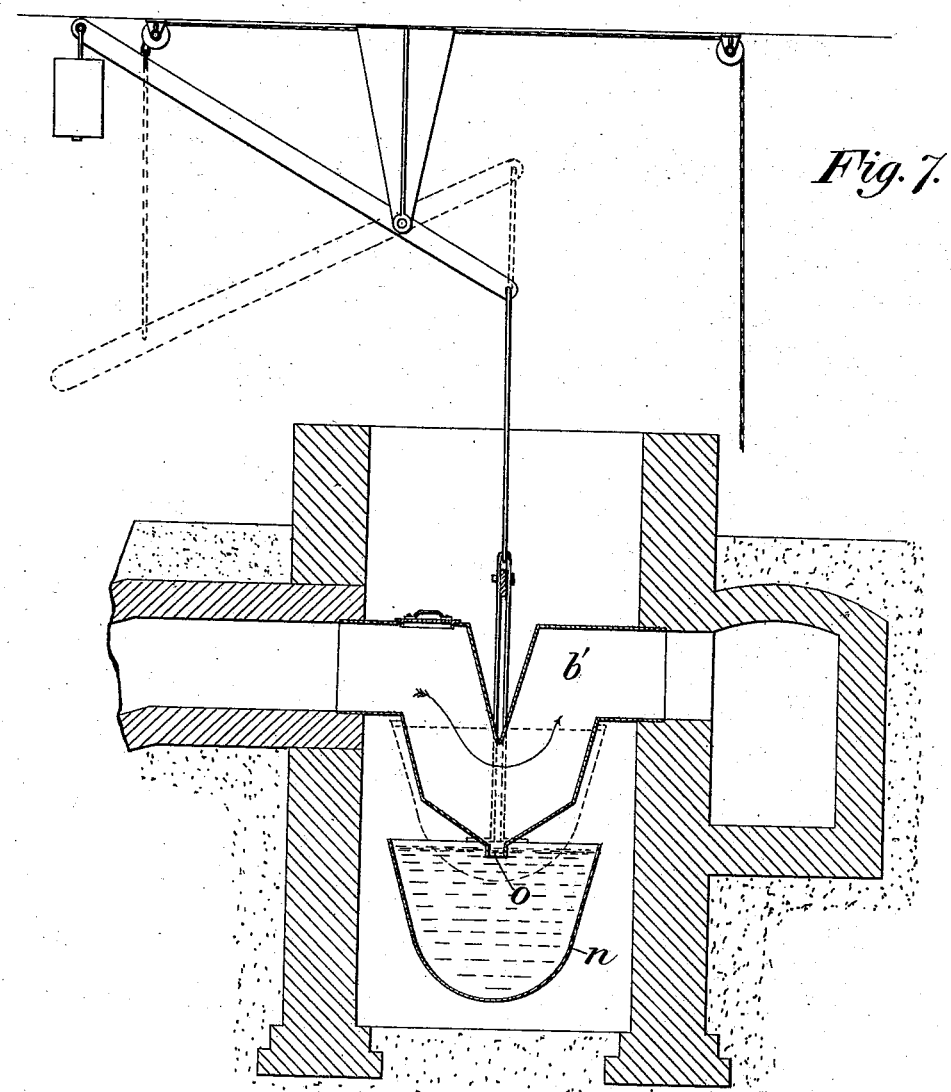

Figure 1 is a longitudinal view part being in section on the line A A of a range of valves under my invention adapted for use with a regenerative air and gas furnace. Fig. 2 is a transverse section at B.B. of an air or flue valve. Fig. 3 is a plan. Fig. 4 is a transverse section at c. c. of a double gas valve; and Fig. 5 is a plan view of a modified form of regenerative valve and connecting flues. Fig. 6 is a cross-sectional view on the line VI—VI of Fig. 5. Fig. 7 is a similar view on the line VII—VII of Fig. 5.

In Figs 1 to 4 inclusive $a$ $a'$ are air valves, $b$ $b'$ are flue valves, $c$. $c'$. are gas valves each connected to the gas inlet way $c^2$. These valves are in the form of tubes having a downward depression. $d$. $d'$ are displacers free to rise and fall in tanks $e$. $e'$. The displacers are connected together by a cord or chain $f$ passing over pulleys $g$ $g'$ on shafts carried in any suitable bearings. On the shafts are also secured specially grooved pulleys $h$ $h'$ around which pass cords or chains $i$ $i'$ to balance weights $j$ $j'$ so that the displacers $d$ $d'$ move together in equilibrium. $k$ is a pipe connecting the valves $a, b$ and $c$ to the tank $e$, and $k'$ is a pipe connecting the valves $a'$ $b'$ and $c'$ to the tank $e'$. $l$ $l'$ are flues.

The action of the apparatus is as follows: When one displacer say $d$ is raised, the other $d'$ descends. The displacer which descends causes the water in its tank $e'$ to flow through the pipe $k'$ into the valves $a'$ $b'$ and $c'$ until the said water seals against the dipping edges $m$ of the valves and communication between the flues $l$ $l'$ is cut off. The ascending displacer $d$ allows the water in the valves $a. b.$ and $c$ to flow back into the tank $e$ until the ways between the flues $l$ $l'$ are open. In the central double valve, the gas conduit connects with the upper portion of both valves $c$ and $c'$. Each valve has a partition $m$, one shown in Fig. 1 and the other in Fig. 4. It will be seen that as the water rises in one of the valves $c'$ above the partition $m$ it leaves the other $c$, so that the gas is directed from the gas inlet $c^2$ through one or other of the valves $c\ c'$ into the flues leading to the furnace. The connecting flues between the furnace chimney regenerators and valves are arranged in any usual way.

Figs. 5, 6, and 7, illustrate another form of valve in which, instead of causing the water to flow into the said valve through a pipe such valve has a trough $n$ beneath it containing water and the trough is raised or lowered by any suitable means when it is desired to open or close the valve. $o$ is the aperture through which water enters the valve. Fresh water is supplied from time to time or automatically through taps to compensate for evaporation. It will be seen that when the valves are open the area of contact between the water and gases is so small that any action between the two may be neglected.

I claim—

1. A valve for furnaces, consisting of a tube having a downward depression therein, a contracted opening in the depression, and means for forcing liquid through said opening; substantially as described.

2. A valve for furnaces, consisting of a tube having a downward depression therein, a contracted opening in the depression, and a vessel arranged to be raised and to force liquid through said opening; substantially as described.

In testimony whereof I have hereunto set my hand this 6th day of October, A. D. 1892.

JOHN WILLIAM WAILES.

Witnesses:
JAMES DOBSON,
CHARLES WILSON.